US010586218B2

(12) United States Patent
Rodoni

(10) Patent No.: US 10,586,218 B2
(45) Date of Patent: Mar. 10, 2020

(54) WASTE MANAGEMENT SYSTEM IMPLEMENTING RECEPTACLE TRACKING

(71) Applicant: Rubicon Global Holdings, LLC, Atlanta, GA (US)

(72) Inventor: Philip Rodoni, Decatur, GA (US)

(73) Assignee: Rubicon Global Holding, LLC, Atlanta, GA (US)

(*) Notice: Subject to any disclaimer, the term of this patent is extended or adjusted under 35 U.S.C. 154(b) by 159 days.

(21) Appl. No.: 15/818,644

(22) Filed: Nov. 20, 2017

(65) Prior Publication Data

US 2018/0174115 A1 Jun. 21, 2018

Related U.S. Application Data

(63) Continuation of application No. 15/382,927, filed on Dec. 19, 2016, now Pat. No. 9,824,337.

(51) Int. Cl.
*G06Q 10/00* (2012.01)
*G06F 3/0481* (2013.01)
*G06F 3/0484* (2013.01)
*H04N 7/18* (2006.01)
*G01S 5/16* (2006.01)
(Continued)

(52) U.S. Cl.
CPC ......... *G06Q 10/30* (2013.01); *G06F 3/04817* (2013.01); *G06F 3/04842* (2013.01); *G01S 5/16* (2013.01); *G01S 13/75* (2013.01); *G01S 15/74* (2013.01); *H04N 7/181* (2013.01); *Y02W 90/20* (2015.05)

(58) Field of Classification Search
CPC . G06Q 10/30; G06F 3/04817; G06F 3/04842; Y02W 90/20; G01S 5/16; G01S 13/75; G01S 15/74; H04N 7/181
See application file for complete search history.

(56) References Cited

U.S. PATENT DOCUMENTS 5,565,846 A * 10/1996 Geiszler ............... B65F 1/1484
177/139
2001/0049583 A1 12/2001 Burnstein et al.
2005/0080520 A1 4/2005 Kline et al.
(Continued)

OTHER PUBLICATIONS

Charlmers University of Technology, "The Student project ROAR—Robot-based Autonomous Refuse handling": (video https://vimeo.com/156620786) Feb. 24, 2016, hereinafter referred to as ROAR. (Year: 2016).*
(Continued)

*Primary Examiner* — Calvin Cheung
(74) *Attorney, Agent, or Firm* — Rock IP, PLLC

(57) ABSTRACT

A system is disclosed for tracking receptacles serviced by a service vehicle. The system may have a locating device located onboard the at least one service vehicle and configured to generate a location signal indicative of a location of the at least one service vehicle, a receptacle sensor located onboard the at least one service vehicle and configured to generate an identity signal indicative of an identity of a receptacle in a vicinity of the at least one service vehicle, and a display. The system may also have at least one controller in communication with the locating device, the sensor, and the display. The at least one controller may be configured to show on the display an icon representing the receptacle overlaid on a map based on the location and identification signals.

16 Claims, 5 Drawing Sheets

(51) Int. Cl.
  *G01S 13/75* (2006.01)
  *G01S 15/74* (2006.01)

(56) References Cited

U.S. PATENT DOCUMENTS

2005/0281653 A1* 12/2005 Channel .................... B60L 8/00
                                                              414/498
2014/0172174 A1   6/2014 Poss et al.
2014/0379588 A1* 12/2014 Gates ................ G06Q 10/0631
                                                              705/308
2017/0174427 A1*  6/2017 Wagner ................ B65F 1/1452
2018/0079591 A1*  3/2018 Doty ........................ B65F 3/00

OTHER PUBLICATIONS

International Search Report PCT/US17/67245 dated Mar. 6, 2018.

* cited by examiner

WASTE MANAGEMENT SYSTEM IMPLEMENTING RECEPTACLE TRACKING

CROSS-REFERENCED APPLICATIONS

The present application is a continuation of U.S. patent application Ser. No. 15/382,927 filed on Dec. 19, 2016, which is incorporated by reference in its entirety.

TECHNICAL FIELD

The present disclosure relates generally to a waste management system and, more particularly, to a waste management system implementing receptacle tracking.

BACKGROUND

Commercial and residential waste service providers often provide receptacles to their customers for use in waste disposal. The receptacles are placed at particular locations on a customer's property, filled with waste by the customer, and then periodically emptied by the corresponding service provider. In some situations, the customer's needs for waste services can change and, as a result, additional or different receptacles may need to be delivered to the customer property to replace outdated, undersized, and/or unneeded receptacles. In addition, the receptacles can wear and/or be damaged and must occasionally be repaired or replaced. Further, customers may switch between service providers every so often, requiring a corresponding swap of the receptacles that are placed at the customer's property.

Because of the variability in receptacle use in the waste service industry, it can be difficult to keep track of the different receptacles at each customer property. If not otherwise accounted for, some receptacles can be forgotten, left unused or unserviced, lost and/or stolen. All of this can result in lost profit for waste service providers, both in the way of service fees and equipment costs.

The disclosed system is directed to overcoming one or more of the problems set forth above and/or other problems of the prior art.

SUMMARY

In one aspect, the present disclosure is directed to a system for tracking a plurality of receptacles serviced by at least one service vehicle. The system may include a locating device located onboard the at least one service vehicle and configured to generate a location signal indicative of a location of the at least one service vehicle, a receptacle sensor located onboard the at least one service vehicle and configured to generate an identity signal indicative of an identity of a receptacle in a vicinity of the at least one service vehicle, and a display. The system may also include at least one controller in communication with the locating device, the sensor, and the display. The at least one controller may be configured to show on the display an icon representing the receptacle overlaid on a map based on the location and identification signals.

In another aspect, the present disclosure is directed to a method for tracking a plurality of receptacles serviced by at least one service vehicle. The method may include determining a location of the at least one service vehicle, and detecting an identity of a receptacle in a vicinity of the at least one service vehicle. The method may also include displaying an icon representing the receptacle overlaid on a map based on the location of the at least one service vehicle and the identity of the receptacle.

In yet another aspect, the present disclosure is directed to a non-transitory computer readable medium containing computer-executable programming instructions for performing a method of tracking a plurality of receptacles serviced by at least one service vehicle. The method may include determining a location of the at least one service vehicle, and detecting an identity of a receptacle in a vicinity of the at least one service vehicle. The method may further include detecting a characteristic of the receptacle in the vicinity of the service vehicle, and displaying an icon representing the receptacle overlaid on a map based on the location of the at least one service vehicle, the identity of the receptacle, and the characteristic. The method may additionally include updating the map with locations of the plurality of receptacles in near real-time based on receptacle locations, receptacle identities, and receptacle characteristics received remotely from onboard the at least one service vehicle.

DETAILED DESCRIPTION

Figure 1:
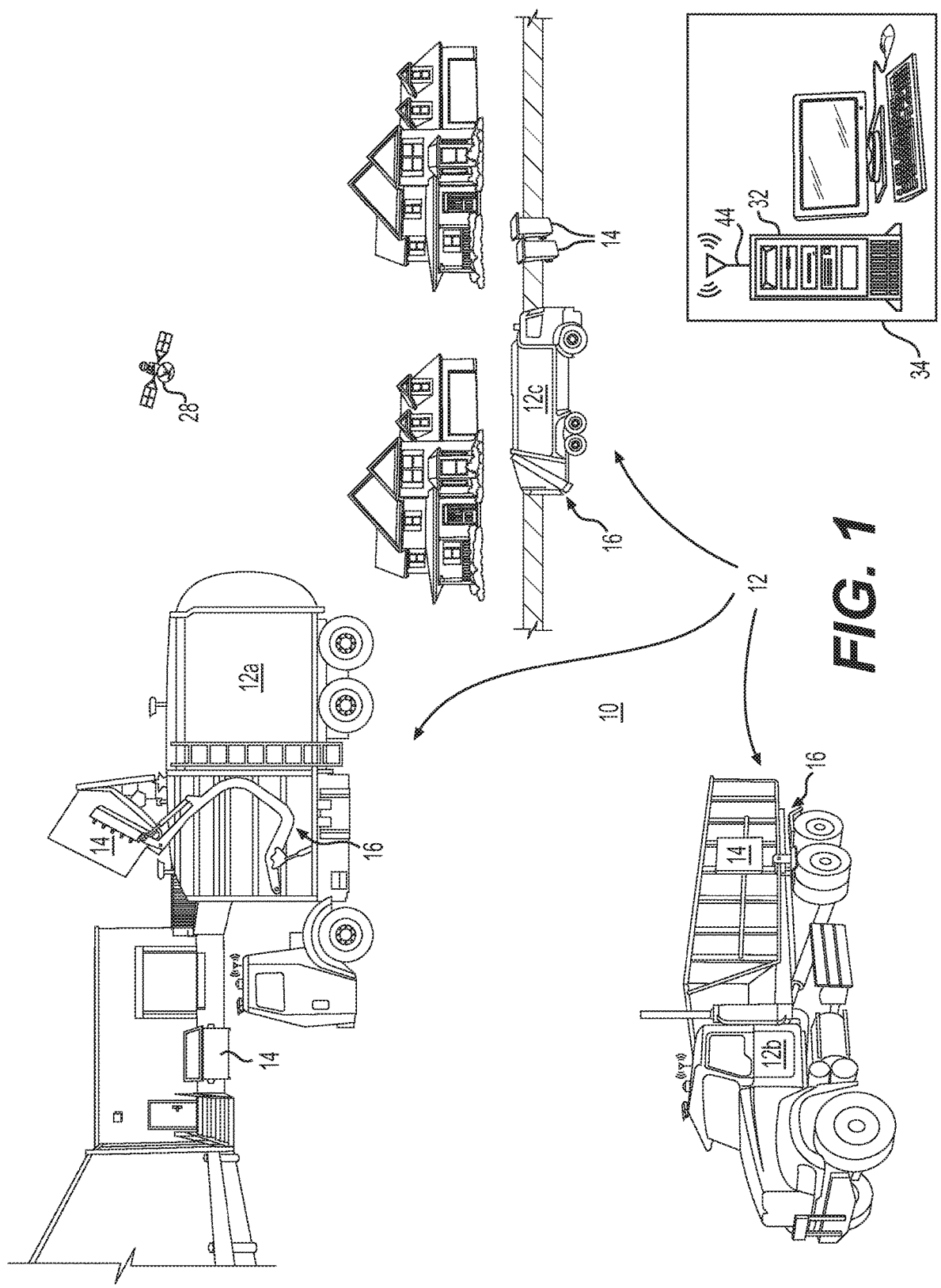
FIG. 1 is an isometric illustration of an exemplary disclosed waste management environment.

FIG. 1 illustrates an exemplary waste management environment ("environment") 10, at which one or more service vehicles 12 are providing waste services. Environment 10 may include a retail store, a factory, a government building, a residential address, or another location having one or more receptacles 14 that require the service of service vehicle 12. The service may include, for example, the retrieval of waste materials from inside of receptacle(s) 14, the replacement of receptacle(s) 14, and/or the placement of new or additional receptacles 14.

Service vehicle 12 may take many different forms. In the uppermost example shown in FIG. 1, service vehicle 12*a* is a hydraulically actuated, front-loading type of service vehicle. Specifically, service vehicle 12*a* may be configured to onload (e.g., pickup), carry, offload (e.g., drop off), and/or empty commercial type dumpsters (e.g., receptacles 14 having a volumetric capacity of about 2-8 yards) by way of a front-mounted lifting arrangement 16. In the lowermost example shown in FIG. 1, vehicle 12*b* is a flatbed or roll-off type of vehicle. Specifically, vehicle 12*b* may be configured to onload, carry, offload, and/or empty roll-off type dumpsters (e.g., receptacles 14 having a volumetric capacity of about 10-40 yards) by way of a rear-mounted lifting arrangement 16. In the rightmost example shown in FIG. 1, vehicle 12*c* is a residential type of vehicle. Specifically, vehicle 12*c* may be configured to onload, carry, offload, and/or empty household waste bins (e.g., receptacles 14 having a volumetric capacity of up to 100 gallons) by way of a front-, rear-, and/or side-mounted lifting arrangement 16. In some embodiments, the household waste bins may also be manually onloaded, offloaded, and/or emptied.

As each service vehicle 12 moves about environment 10, a satellite 28 or other tracking device may communicate with an onboard controller 30 (shown only in FIG. 2) to monitor the movements of service vehicle 12 and the associated changes made to environment 10 (e.g., onloading, offloading, carrying, emptying, etc.). As will be explained in more detail below, onboard controller 30, or a separate offboard controller (e.g., a controller 32 located in a back office 34 or other service facility), may then track and/or manage operations of each service vehicle 12 based on these movements and changes.

Both of onboard and offboard controllers 30, 32 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
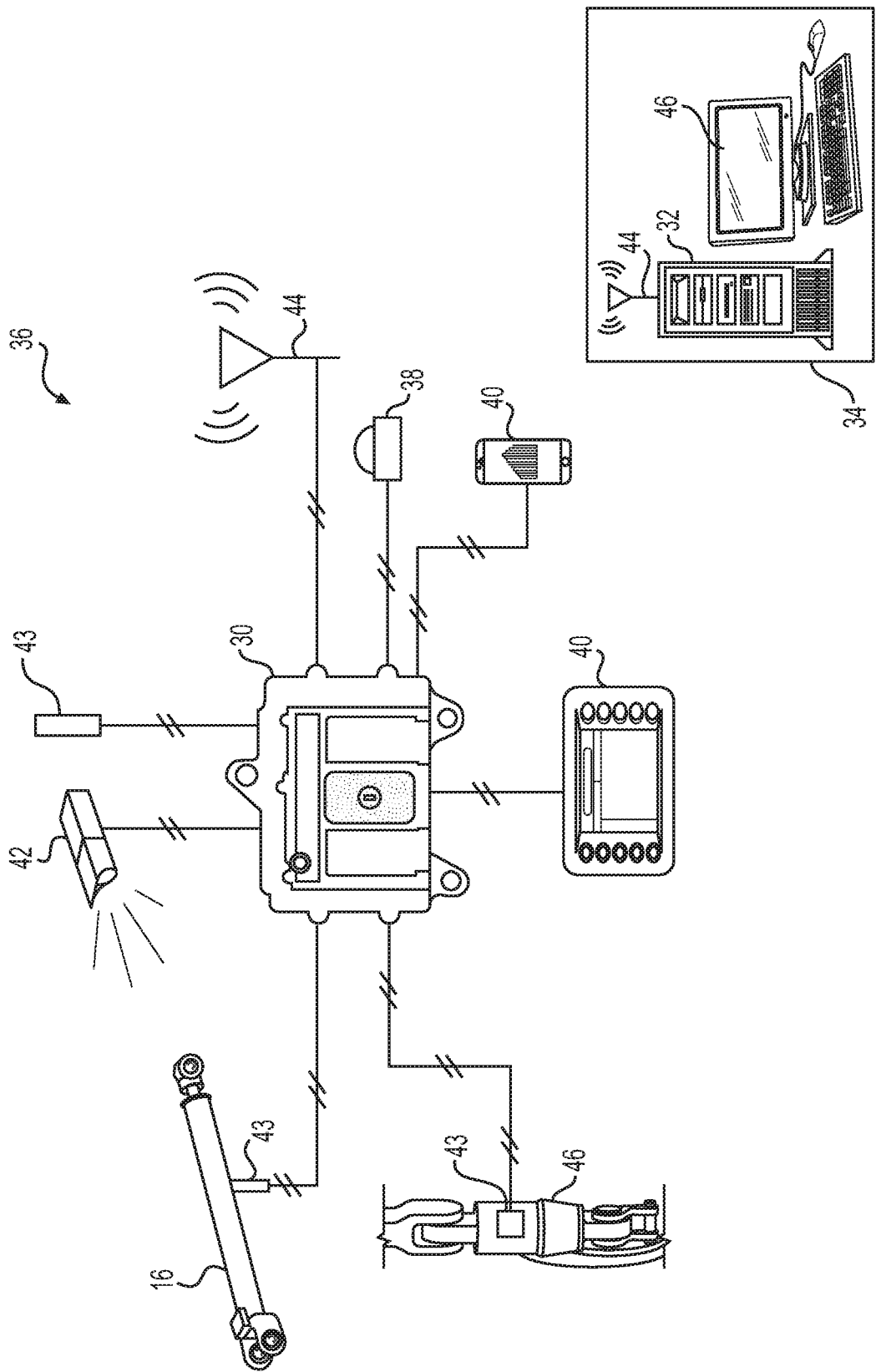
FIG. 2 is a diagrammatic illustration of an exemplary disclosed system that may be used to manage the environment of FIG. 1.

As shown in FIG. 2, onboard controller 30 may form a portion of a waste management system ("system") 36 that is configured to track, assist, manage and/or control movements of service vehicle 12 and receptacles 14 (shown only in FIG. 1). In addition to onboard controller 30, system 36 may also include a locating device 38, a manual input device 40, at least one receptacle sensor 42, and at least one operation sensor 43. In some embodiments, receptacle sensor(s) 42, operation sensor(s) 43, and/or onboard controller 30 may be internal to manual input device 40. Onboard controller 30 may be in communication with each of these other components and/or with offboard controller 32 at back office 34 (e.g., via a communication device 44), and configured to determine, based on signals from these components and based on other known information stored in memory, the location of each service vehicle 12, and characteristics and locations of receptacles 14 being moved by and/or in a vicinity of each service vehicle 12.

Locating device 38 may be configured to generate signals indicative of a geographical position and/or orientation of service vehicle 12 and/or receptacle 14 (e.g., a receptacle 14 being onloaded, carried, offloaded, emptied, and/or simply in the vicinity of vehicle 12) relative to a local reference point, a coordinate system associated with environment 10, a coordinate system associated with Earth, or any other type of 2-D or 3-D coordinate system. For example, locating device 38 may embody an electronic receiver configured to communicate with satellites 28 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. Based on the signals generated by locating device 38 and based on known kinematics of service vehicle 12 and/or receptacle 14, onboard controller 30 may be able to determine in near real-time, the position, heading, travel speed, acceleration, and orientation of service vehicle 12 and receptacle 14. This information may then be used by onboard and/or offboard controllers 30, 32 to update the locations and conditions of service vehicle(s) 12 and/or receptacles 14 in an electronic map or database of environment 10.

Manual input device 40 may provide a way for an operator of service vehicle 12 to input information regarding observances made while traveling around environment 10. For example, the operator may be able to enter a type and/or condition of waste observed at a particular location; an amount of waste in or around receptacle 14; an identity, fill status, condition, location, etc. of a particular receptacle 14, and/or information associated with the particular vehicle 12 servicing a particular receptacle 14. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 40, if desired. In addition to receiving manual input from an operator, input device 40 may also be capable of displaying information, for example the electronic map of environment 10, instructions from back office 34, scheduling, receptacle information (e.g., ID, configuration, location, weight, condition, etc.), payload information (e.g., weight and/or volume), questions, etc.

In some embodiments, input device 40 may be configured to execute an application. For example, when input device 40 is a mobile device (for example a smartphone), the application can be a mobile app ("app"). The app can provide a graphical user interface (GUI) that displays information about a waste handling operation and/or associated receptacle 14 to an operator of service vehicle 12; and that receives input from the operator used to configure acquisition of operational data by receptacle sensor 42, to transmit the operational data to controllers 30, 32, to receive and display information about a current operation (e.g., as monitored by receptacle sensor 42), etc.

Any number of sensors 42 may be mounted at any location suitable for capturing data associated with receptacles 14. In one example, receptacle sensor 42 is a camera mounted onboard vehicle 12 and positioned to capture an image of receptacle 14 as vehicle 12 approaches and/or services (e.g., onloads, carries, empties, offloads, etc.) receptacle 14. In particular, receptacle sensor 42 may be configured to capture an image of a receptacle identification provided on (e.g., a series of alpha-numeric characters written on, welded onto, stuck on, cut into, etc.) receptacle 14. Based on the image, the identity of receptacle 14 may be determined and linked to the location of vehicle 12 detected via locating device 38.

In another example, receptacle sensor 42 could be a scanner (e.g., an RFID scanner, a barcode scanner, a near-field scanner, etc.) configured to interact with an indicia (e.g., an RFID tag, a barcode, a magnetic field, etc.) affixed to receptacle 14. For the purposes of this disclosure, an indicia may be considered any readable identifier that contains, stored, and/or produces, data identifying receptacle 14. Based on the reading of the indicia, the identity of receptacle 14 may be linked to the detected location of vehicle 12.

The data captured by receptacle sensor(s) 42 may be digitized and stored within an internal memory, communicated to onboard controller 30 (e.g., via Bluetooth), and/or communicated to offboard controller 32 via wired or wireless technology. In some instances, the digitized data may be streamed wirelessly (e.g., via Bluetooth) to controller 30, which may then store the data for later download and/or relay the data to offboard controller 32 via communication device 44. As will be explained in more detail below, the image data may be shown on a display 46 at back office 34 and viewed by a human operator as part of the waste handling process.

Operation sensor 43 may be any type of sensing and/or transducing device configured to monitor a parameter associated with the waste service operation being performed by service vehicle 12, and to generate corresponding signals indicative thereof. Each of these operation sensors 43 may be located anywhere on or in service vehicle 12. In one example, operation sensor 43 may embody a lift sensor, such as any one or more of a load cell, a force gauge, a pressure sensor, a motion sensor, or another type of lift sensor associated directly with lifting arrangement 16, with receptacle 14, and/or with a strut supporting the bed of vehicle 12. In this example, the signals generated by operation sensor 43 may correspond with strain on lifting arrangement 16, with a force applied to lifting arrangement 16, with a payload weight of service vehicle 12 and/or receptacle 14, with a motion of receptacle 14, etc.

Other types of operation sensors 43 (e.g., optical sensors such as spectrometers, RADAR sensors, LIDAR sensors, etc.) may also be utilized to determine characteristics (e.g., load profile, volume, and/or shape) of the waste material inside receptacles 14 or of receptacles 14 themselves. In yet further examples, operation sensor 43 could be an acoustic sensor (e.g., one or more microphones), an accelerometer, or another similar type of sensor configured to detect engagement conditions and/or cycle completion of lifting arrangement 16, an in-bed compactor, a receptacle door, etc. during onloading, carrying, emptying, offloading, etc. of receptacle 14. Other types of operation sensors 43 (e.g., proximity sensors) may alternatively or additionally be utilized.

Operation signals generated by operation sensor(s) 43 may be communicated to onboard and/or offboard controllers 30, 32, and the processor of the appropriate controller may use the signals to determine characteristics of receptacles 14 before, during, and/or after servicing of receptacles 14 by service vehicle 12. As described above, any one or more of sensors(s) 43 (as well as controller 30) may form an integral portion of input device 40 (e.g., the smartphone or tablet carried by the operator) or be a standalone component in wired or wireless communication with controllers 30, 32 and/or input device 40, as desired.

Onboard controller 30 may be configured to manage communications between other onboard components and offboard controller 32 located at back office 34. For example, onboard controller 30 may receive signals from locating device 38, input device(s) 40, receptacle sensor(s) 42, and operational sensor(s) 43, and correlate the signals, filter the signals, buffer the signals, record the signals, or otherwise condition the signals before directing the signals offboard via communication device 44.

Communication device 44 may be configured to facilitate communication between onboard controller 30 and offboard controller 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and offboard controller 32 may communicate directly with locating device 38, input device(s) 40, receptacle sensor(s) 42, and/or operational sensor(s) 43 via communication device 44, if desired. Other means of communication may also be possible.

Figure 3:
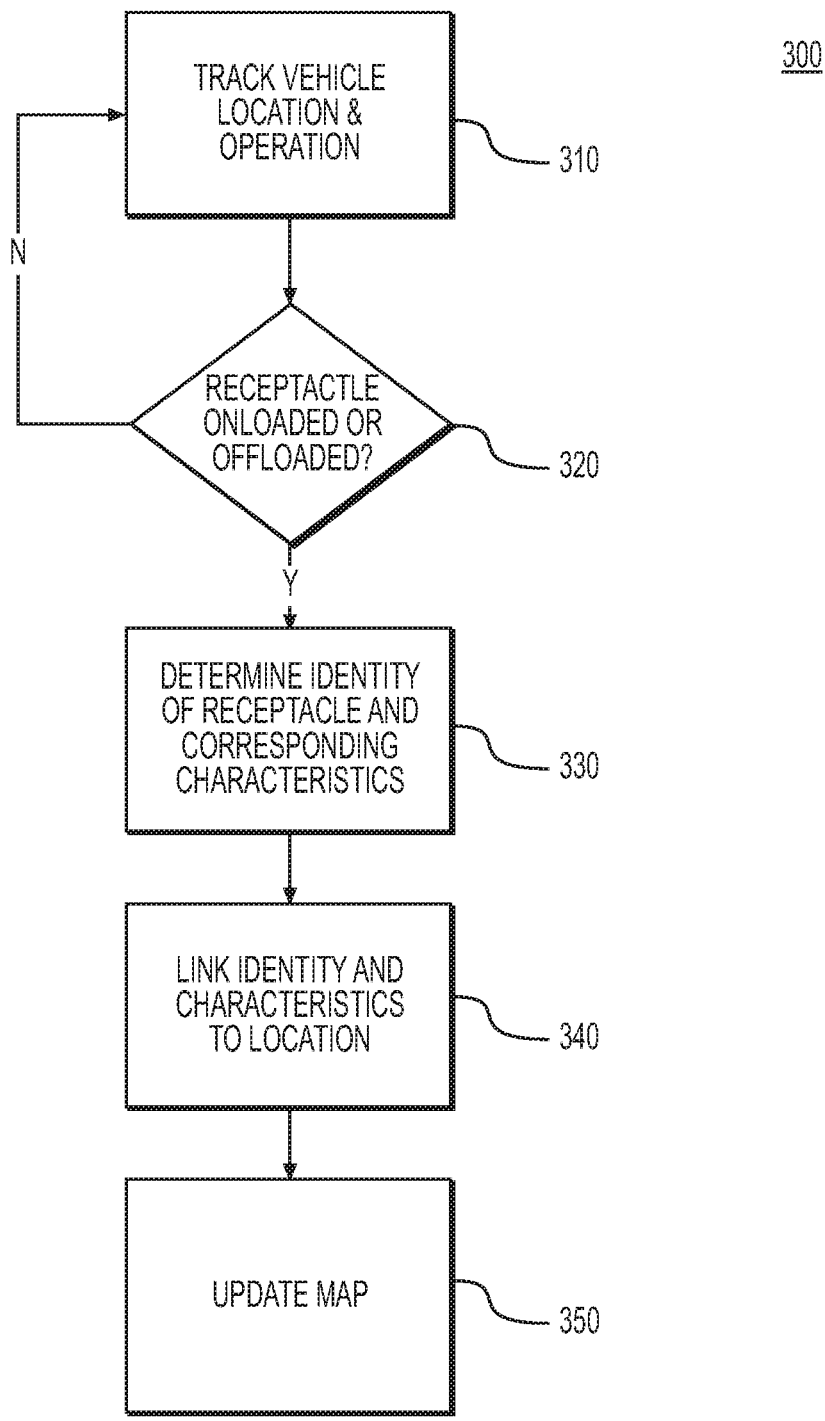
FIG. 3 is a flowchart depicting an exemplary disclosed method that may be performed by the system of FIG. 2.
Figure 4:
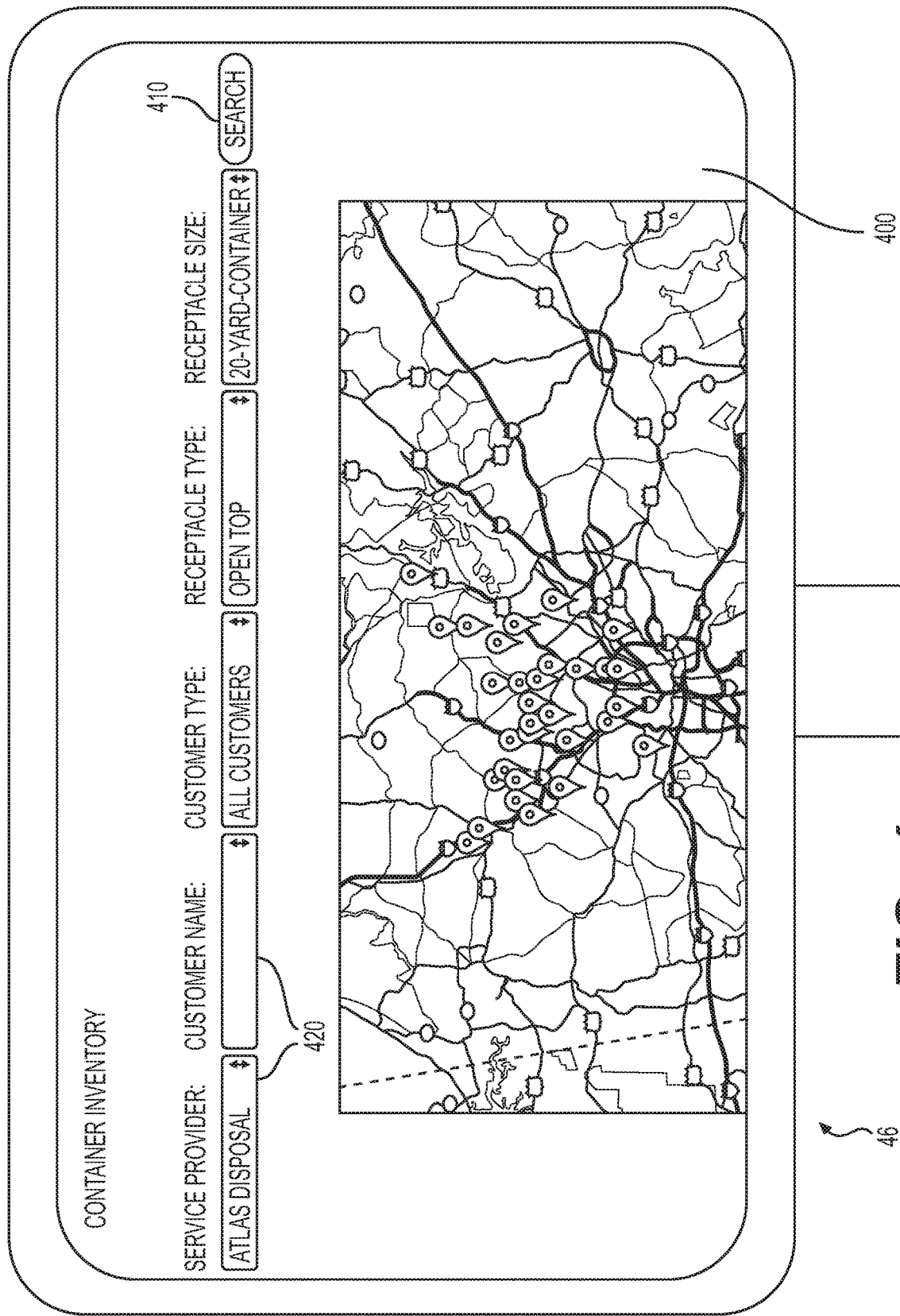
FIGS. 4 and 5 are diagrammatic illustrations of exemplary disclosed graphical user interfaces that may be used to access the system of FIG. 2.
Figure 5:
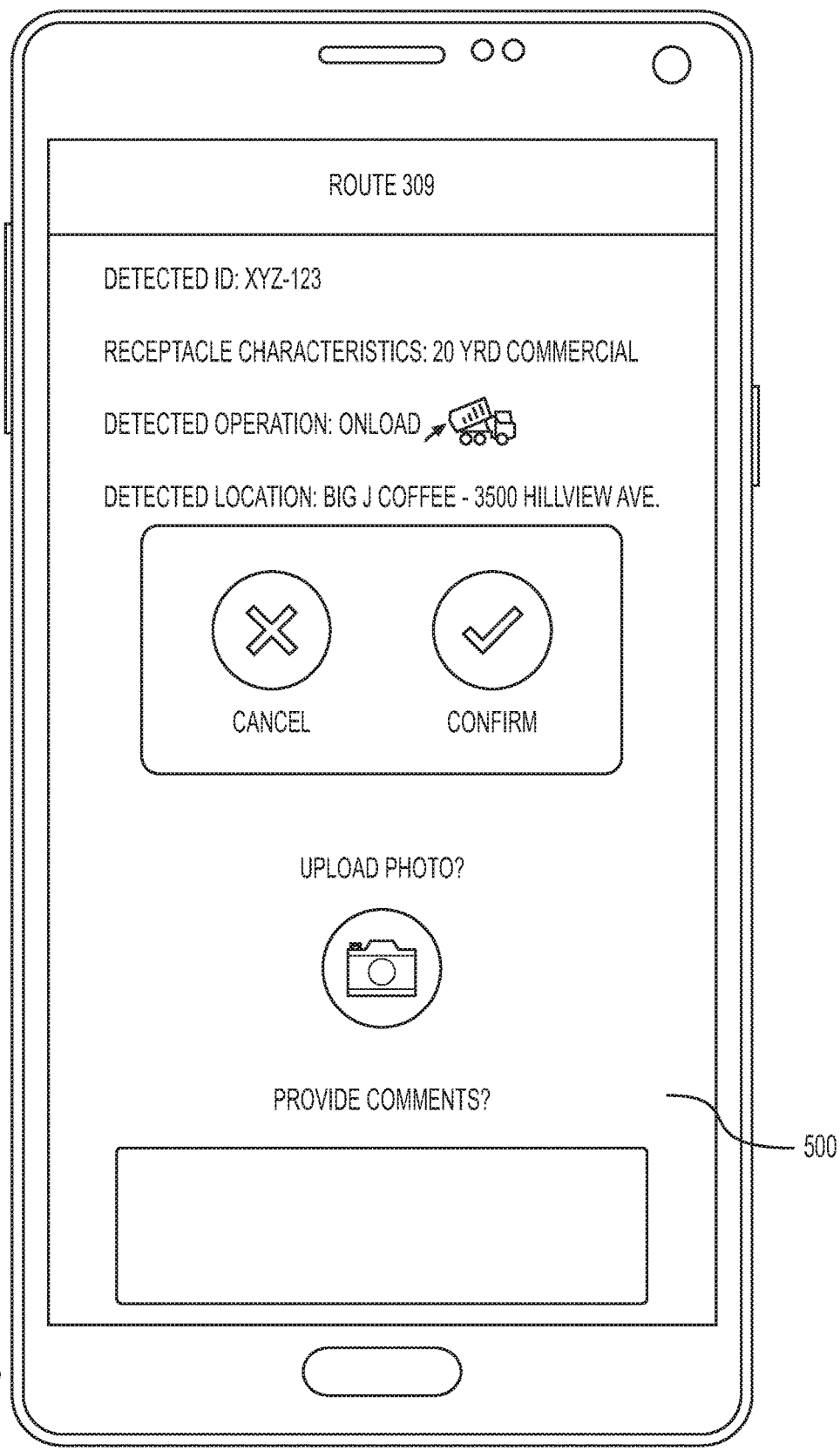

Onboard and/or offboard controllers 30, 32, based on the information received from onboard service vehicles 12 and also based on information received from other sources (e.g., from the Internet, from input at back office 34, etc.), can be configured to execute instructions stored on computer readable medium to perform methods of waste management at environment 10. For example, onboard and/or offboard controllers 30, 32 may be configured to locate, map, characterize, categorize, and/or display information associated with receptacles 14 used by a particular service provider. This may be an ongoing process, which benefits from automated near real-time updates during movement of receptacles 14 by service vehicles 12. An exemplary process 300 is illustrated in FIG. 3, and will be explained in more detail in the following section to further illustrate the disclosed concepts. In addition, FIGS. 4 and 5 represent exemplary Graphical User Interfaces (GUIs) that may be shown in connection with the disclosed waste management app on any input device 40 for use by the operator of service vehicle 12 (and/or by a service manager at back office 34) to access system 36. FIGS. 4 & 5 will also be discussed in greater detail below to further illustrate the disclosed concepts.

INDUSTRIAL APPLICABILITY

The disclosed system may be applicable to the waste service industry, where accurate tracking and management of resources can affect efficiency and profitability for the service provider. The disclosed system may be able to automatically perform condition, location, and/or use tracking of receptacles 14, while receptacles 14 are being serviced by vehicle 12. In addition, the disclosed system may provide mapping tools for a user that allow the user to process the condition, location, and use data associated with receptacles 14, such that the user may then manage the resources of the service provider in a more knowledgeable manner. Operation of system 36 will now be described with reference to FIG. 3.

As shown in FIG. 3, method 300 may begin with the tracking of service vehicle location and operation (Step 310). In particular, as service vehicle 12 moves about environment 10 (referring to FIG. 1), the location of service vehicle 12 may be tracked via locating device 38 (referring to FIG. 2). In addition, in some embodiments, the operation (e.g., travel speed, lift motion, acoustics, image capturing, indicia scanning, etc.) associated with service vehicle 12 may be monitored via receptacle and/or operation sensor(s) 42 and/or 43. This information may then be aggregated and used (e.g., by onboard and/or offboard controllers 30 and 32) to determine if service vehicle 12 is servicing (e.g., onloading, carrying, emptying, offloading, dumping, shaking, or otherwise moving), has serviced, is about to service, or is simply detected within the vicinity (e.g., within a threshold distance of a given location and/or proximity) of a particular receptacle 14 (Step 320).

For example, signals generated by operational sensor(s) 43 may be used to detect a change in weight of service vehicle 12 during onloading and/or offloading of an identified receptacle 14, a change in a vibrational signature of lifting arrangement 16 during onloading or offloading, a change in lift force, or another similar change. These changes may then be indexed according to time, and linked to the identity (e.g., to time-stamped images and/or other scanned indicia information) of receptacle 14 captured by receptacle sensor(s) 42 and the location signal generated by locating device 38. In this manner, the movement of receptacle 14 affected and/or detected by service vehicle 12 may be accurately determined.

The data collected by locating device 38, receptacle sensor(s) 42, and/or operation sensor(s) 43 may be communicated to offboard controller 32 in any number of different ways. For example, the data could be streamed in real or near-real time (or periodically) to onboard controller 30 (e.g., via Bluetooth), which may then relay the information to offboard controller 32 (e.g., via communication device 44). Alternatively, onboard controller 30 may record the data into memory for later download to offboard controller 32. In yet another embodiment, locating device 38, receptacle sensor(s) 42, and/or operation sensor(s) 43 may communicate directly with offboard controller 32.

Regardless of the way in which the data from locating device 38, receptacle sensor(s) 42, and/or operation sensor(s) 43 is communicated to offboard controller 32, the data may be used by controller(s) 30 and/or 32 to determine an identity and characteristics of the detected receptacle 14 (Step 330), and to link the location of vehicle 12 to the identity (Step 340). The electronic map described above may then be populated and/or updated with the known locations and conditions of all receptacles 14 owned by a particular service provider (Step 350).

In one embodiment, the data collected at steps 310, 330, and/or 340 may be at least partially affected by manual input. In particular, it may be possible for the onboard operator of vehicle 12 to provide input indicative of the identity, the characteristics, and/or the location of receptacle 14. For example, controller(s) 30 and/or 32 may rely primarily on sensory input, but still receive input from the human operator when the sensory input results in inconclusive determinations, has a low confidence level, or is in error. In another example, controller(s) 30 and/or 32 may normally rely on both sensory input and input from the human operator, which may then be aggregated to produce more accurate identity, characteristic, and/or location data associated with receptacle 14. In yet another embodiment, the human operator may provide all input regarding the identity, characteristics, and/or location of receptacle 14. Other strategies may also be employed, in certain situations.

FIG. 4 shows an exemplary GUI 400, which may be used in connection with the method that is described above and shown in FIG. 3. GUI 400 may be shown on any input device 40 and/or on display 46 at back office 34. Among other things, GUI 400 may be caused to show a map, and icons overlaying the map and representing any number of different receptacles 14 for which subscribing service providers are responsible. The displayed receptacles 14 may be the same receptacles 14 whose identities, characteristics, and locations were detected, processed, recorded, and/or communicated via the method of FIG. 3 described above, and/or other receptacles 14 whose identities, characteristics, and locations are generated via manual uploading of related information (e.g., information uploaded at back office 34). In some embodiments, the displayed identities, characteristics, and locations may dynamically change based on the signals generated by service vehicles 12 during servicing of receptacles 14 (e.g., based on the signals generated by receptacle sensor(s) 42, operation sensor(s) 43, and operator input).

As can also be seen in FIG. 4, GUI 400 may provide a way for the user to search, organize, and/or manage the information shown on display 46. For example, GUI 400 may provide a search filter, allowing the user to choose only those receptacles 14 to be shown that have particular characteristics. For example, the user may be able to choose (e.g., via one or more virtual buttons 410 and/or drop-down windows 420) particular characteristics of receptacles 14 (e.g., service provider, customer name, customer type, receptacle type, receptacle size, empty receptacles, full receptacles, receptacles in transport, damaged receptacles, age, condition, ownership, location, last serviced, etc.) to be used as filtering criteria. Only those receptacles 14 matching the search criteria would then be shown on display 46. It is also contemplated that statistics for each receptacle 14 may be accessed via GUI 400, for example by clicking on the particular icon associated with that receptacle 14. These statistics may include, for example, a date of offloading, a date of onloading, a current fill status, a number of turns (e.g., empty/fill cycles completed) within a particular time period, a current condition, an age, etc.

FIG. 5 shows an exemplary GUI 500, which may be used by the vehicle operator in connection with the method that is described above and shown in FIG. 3. GUI 500 may be displayed on any input device 40 carried by the operator or otherwise mounted inside of vehicle 12. Among other things, GUI 500 may be caused to show a current route that the operator is following, an identity of a receptacle 14 detected by receptacle sensor(s) 42, characteristics known and/or detected via operation sensor(s) 43 about the identified receptacle 14, a detected operation involving receptacle 14, etc. In addition, GUI 500 may provide a way for the operator to provide feedback regarding the detected information (e.g., to confirm or cancel the detected information, to upload a photo of the identified receptacle 14, and/or to leave comments about receptacle 14).

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for tracking a plurality of receptacles serviced by at least one service vehicle, comprising:
   a non-transitory memory;
   one or more processors coupled to the non-transitory memory and configured to execute instructions to perform operations comprising:
      determining a location of the at least one service vehicle;
      detecting an identity of a receptacle in a vicinity of the at least one service vehicle;
      detecting a waste service being performed by the service vehicle;
      identifying the location and identity of a receptacle in response to detecting the waste service being performed; and
      updating a map with locations of the plurality of receptacles in near real-time based on receptacle locations, receptacle identities, and receptacle characteristics received remotely from onboard the at least one service vehicle.

2. The system of claim 1, further comprising an operation sensor includes at least one of a lift sensor, an optical sensor, an acoustic sensor, and a proximity sensor.

3. The system of claim 1, further comprising an operation sensor located on board the at least one service vehicle, the operations further comprising generating an operation signal indicative of a characteristic of the receptacle.

4. The system of claim 1, further including a display device located onboard the at least one service vehicle, wherein the operations further comprise updating the map on the display device.

5. The system of claim 4, the operations further comprising:
receiving filter criteria associated with the plurality of receptacles; and
based on the filter criteria, selectively displaying icons associated with only a subset of the plurality of receptacles.

6. The system of claim 5, wherein the filter criteria includes at least one of a service provider, a customer name, a customer type, a receptacle type, and a receptacle size.

7. The system of claim 1, further comprising a camera configured to capture an image of a number written on, welded onto, stuck on, or cut into the receptacle.

8. The system of claim 1, further comprising a receptacle sensor is a scanner configured to interact with an indicia located on the receptacle.

9. The system of claim 8, wherein the indicia is one of an RFID tag, a barcode, and a magnetic field.

10. The system of claim 1, the operations further comprising:
receiving manual input from a user indicative of a receptacle location; and
showing on the display an icon representing the location and identification of a receptacle based on the manual input.

11. A method of tracking a plurality of receptacles serviced by at least one service vehicle, the method comprising:
determining a location of the at least one service vehicle;
detecting an identity of a receptacle in a vicinity of the at least one service vehicle;
detecting a waste service being performed by the service vehicle;
identifying the location and identity of a receptacle in response to detecting the waste service being performed; and
updating a map with locations of the plurality of receptacles in near real-time based on receptacle locations, receptacle identities, and receptacle characteristics received remotely from onboard the at least one service vehicle.

12. The method of claim 11, further including
receiving input from an operator of the at least one service vehicle indicative of at least one of a location of the receptacle, the identity of the receptacle, and a characteristics of the receptacle; and
displaying an icon based on the input received from the operator of the at least one service vehicle.

13. The method of claim 11, wherein detecting the identity of the receptacle includes capturing an image of a number written on, welded onto, stuck on, or cut into the receptacle.

14. The method of claim 11, wherein detecting the identity of the receptacle includes scanning an indicia located on the receptacle.

15. The method of claim 14, wherein the indicia is one of an RFID tag, a barcode, and a magnetic field.

16. The method of claim 11, further including:
receiving filter criteria associated with the plurality of receptacles; and
based on the filter criteria, selectively displaying icons associated with only a subset of the plurality of receptacles.

* * * * *